US012575917B2

(12) United States Patent (10) Patent No.: US 12,575,917 B2

Niedrig et al. (45) Date of Patent: Mar. 17, 2026

(54) EXPOSURE DEVICE FOR ILLUMINATING A DENTAL OBJECT

(71) Applicant: Ivoclar Vivadent AG, Schaan (LI)

(72) Inventors: Christian Niedrig, Rüthi (CH);
Christian Ritzberger, Grabs (CH);
Marc Dittmer, Feldkirch (AT); Markus Rampf, Seewis Dorf (CH)

(73) Assignee: Ivoclar Vivadent AG, Schaan (LI)

( * ) Notice: Subject to any disclaimer, the term of this patent is extended or adjusted under 35 U.S.C. 154(b) by 221 days.

(21) Appl. No.: 18/046,440

(22) Filed: Oct. 13, 2022

(65) Prior Publication Data

US 2023/0119981 A1 Apr. 20, 2023

(30) Foreign Application Priority Data

Oct. 14, 2021 (EP) .................................... 21202635

(51) Int. Cl.
| | |
|---|---|
| *A61C 13/08* | (2006.01) |
| *C03C 4/02* | (2006.01) |
| *C03C 23/00* | (2006.01) |
| *F27B 17/02* | (2006.01) |

(52) U.S. Cl.
CPC .............. *A61C 13/082* (2013.01); *C03C 4/02* (2013.01); *C03C 23/001* (2013.01); *C03C 23/002* (2013.01); *F27B 17/025* (2013.01); *A61C 2201/002* (2013.01)

(58) Field of Classification Search
CPC ..... A61C 13/082; A61C 13/083; A61C 13/14; C03C 23/002; C03C 4/02; C03C 23/001; F27B 17/025
See application file for complete search history.

(56) References Cited

U.S. PATENT DOCUMENTS

| | | | | |
|---|---|---|---|---|
| 2,628,160 | A | 2/1953 | Works | |
| 2,971,853 | A | 2/1961 | Works | |
| 4,208,573 | A * | 6/1980 | Risse | A61C 13/20 |
| | | | | 219/390 |
| 4,480,044 | A | 10/1984 | McAlinn | |
| 4,645,649 | A * | 2/1987 | Nagao | B01J 19/123 |
| | | | | 422/186 |
| 5,062,877 | A | 11/1991 | Borrelli et al. | |
| 5,094,619 | A * | 3/1992 | McLaughlin | A61C 13/082 |
| | | | | 106/35 |
| 5,135,686 | A * | 8/1992 | Masuhara | B29C 35/0277 |
| | | | | 264/1.36 |
| 5,162,130 | A * | 11/1992 | McLaughlin | A61K 6/887 |
| | | | | 264/494 |
| 5,547,635 | A | 8/1996 | Duthie | |

(Continued)

FOREIGN PATENT DOCUMENTS

| | | |
|---|---|---|
| CN | 109896729 A1 | 6/2019 |
| DE | 102005003595 A1 | 7/2006 |

(Continued)

*Primary Examiner* — Jerzi H Moreno Hernandez

(74) *Attorney, Agent, or Firm* — Ann M. Knab; Thad McMurray

(57) ABSTRACT

An exposure apparatus (100) for illuminating a dental object (101), including a chamber (103) for receiving the dental object (101); and a radiation source (105) for emitting radiation having a wavelength shorter than 350 nm into the chamber (103).

5 Claims, 2 Drawing Sheets

(56) References Cited

U.S. PATENT DOCUMENTS

| | | | |
|---|---|---|---|
| RE35,484 E | * | 3/1997 | McLaughlin ............ A61C 5/77 |
| | | | 264/494 |
| 5,698,020 A | | 12/1997 | Salz et al. |
| 7,262,144 B2 | | 8/2007 | Schreder et al. |
| 7,829,489 B2 | | 11/2010 | Borrelli et al. |
| 8,047,021 B2 | | 11/2011 | Schweiger et al. |
| 8,721,336 B2 | | 5/2014 | Rheinberger et al. |
| 9,949,809 B2 | | 4/2018 | Lewis et al. |
| 10,617,495 B2 | | 4/2020 | Korten et al. |
| 11,408,629 B2 | | 8/2022 | Lee |
| 2005/0263719 A1 | * | 12/2005 | Ohdaira ................ C23C 16/401 |
| | | | 250/455.11 |
| 2006/0147339 A1 | | 7/2006 | Hunter |
| 2006/0261503 A1 | | 11/2006 | Sago et al. |
| 2009/0246739 A1 | | 10/2009 | Jussel et al. |
| 2012/0012577 A1 | * | 1/2012 | Jussel .................. A61C 13/203 |
| | | | 219/762 |
| 2012/0309607 A1 | | 12/2012 | Durschang |
| 2013/0270445 A1 | | 10/2013 | Gaska et al. |
| 2013/0295523 A1 | | 11/2013 | Durschang |
| 2014/0113237 A1 | | 4/2014 | Rohner |
| 2014/0141960 A1 | | 5/2014 | Borczuch-Laczka et al. |
| 2014/0200129 A1 | | 7/2014 | Durschang |
| 2014/0231408 A1 | | 8/2014 | Jussel |
| 2014/0252272 A1 | | 9/2014 | Durschang |
| 2014/0339216 A1 | | 11/2014 | Jussel |
| 2014/0370464 A1 | * | 12/2014 | Kounga ............ A61C 13/0022 |
| | | | 427/2.26 |
| 2015/0140274 A1 | | 5/2015 | Burke |
| 2015/0374589 A1 | | 12/2015 | Rampf |

| | | | |
|---|---|---|---|
| 2016/0057816 A1 | | 2/2016 | Alias |
| 2016/0257607 A1 | | 9/2016 | Ritzberger |
| 2016/0340228 A1 | | 11/2016 | Schreder et al. |
| 2017/0088456 A1 | | 3/2017 | Rampf |
| 2017/0144919 A1 | | 5/2017 | Krolikowski et al. |
| 2017/0156828 A1 | | 6/2017 | Leeson |
| 2017/0355636 A1 | | 12/2017 | Borrelli |
| 2018/0009701 A1 | | 1/2018 | Rampf |
| 2018/0244563 A1 | | 8/2018 | Dittmer |
| 2018/0256297 A1 | * | 9/2018 | Vollmann ............ C03C 10/0009 |
| 2018/0290913 A1 | | 10/2018 | Gödiker |
| 2019/0167395 A1 | * | 6/2019 | Baholzer ............... F27B 17/025 |
| 2019/0217534 A1 | * | 7/2019 | Verboomen ........... B29C 64/135 |
| 2020/0000563 A1 | | 1/2020 | Specht |
| 2022/0318520 A1 | | 10/2022 | Pouran Ben Veyseh et al. |
| 2022/0318683 A1 | | 10/2022 | Sawaf et al. |
| 2023/0012752 A1 | * | 1/2023 | Ritzberger ............. A61K 6/822 |
| 2023/0119981 A1 | | 4/2023 | Niedrig |
| 2023/0121316 A1 | * | 4/2023 | Rampf ............... A61C 13/0004 |
| | | | 409/131 |
| 2023/0125010 A1 | * | 4/2023 | Ritzberger ............. A61C 13/20 |
| | | | 433/25 |

FOREIGN PATENT DOCUMENTS

| | | | |
|---|---|---|---|
| FR | 2507296 A1 | * | 12/1982 |
| JP | 3203603 U | | 4/2016 |
| WO | 2004051716 A1 | | 6/2004 |
| WO | 2011113568 A1 | | 9/2011 |
| WO | 2012057252 A1 | | 5/2012 |
| WO | 2018162055 A1 | | 9/2018 |
| WO | 2021048733 A1 | | 3/2021 |

* cited by examiner

EXPOSURE DEVICE FOR ILLUMINATING A DENTAL OBJECT

CROSS-REFERENCE TO RELATED APPLICATIONS

This application claims priority to European patent application No. 21202635.5 filed on Oct. 14, 2021, which disclosure is incorporated herein by reference in its entirety.

TECHNICAL FIELD

The present invention relates to an exposure apparatus for illuminating a dental object and a method for illuminating a dental object.

BACKGROUND

Polychromic glasses and glass-ceramics can be colored by a light exposure in combination with a thermal treatment, such as a quartz glass, a quartz glass-ceramic, a lithium aluminosilicate glass, a lithium aluminosilicate glass-ceramic, a lithium silicate glass or a lithium silicate glass-ceramic. In this case, light exposure is usually by means of UV radiation. The distinct color effect is produced after light exposure mainly by an additional temperature treatment.

For this purpose, the polychromic glasses and glass-ceramics comprise, for example, an oxidizable component and a reducible coloring component. The oxidizable component is a component that can be oxidized or excited to emit electrons by irradiation. Oxidizable components include, for example, cerium ions, europium ions, erbium ions, copper ions, and mixtures thereof. The reducible dye component is, for example, a component that can be reduced to form a color change. Preferred reducible dye components are cations of metals, such as silver, gold, copper, or combinations thereof.

SUMMARY

It is the technical aim of the present invention to provide an application-safe coloring of a dental object by means of short-wave radiation.

This technical problem is solved by objects according to the independent claims. Technically advantageous embodiments are the subject of the dependent claims, the description and the drawings.

According to a first aspect, the technical problem is solved by an exposure apparatus for illuminating a dental object, comprising: a chamber for receiving the dental object; and a radiation source for emitting radiation having a wavelength smaller than 350 nm in the chamber. The emitted radiation is for exposing the dental object to light. This achieves the technical advantage that the dental object can be exposed in a closed area and leakage of radiation is prevented.

In a technically advantageous embodiment of the exposure device, the radiation source is configured to emit radiation with a wavelength between 350 nm and 5 pm, preferably between 350 nm and 10 nm, or most preferably between 350 nm and 100 nm. This provides, for example, the technical advantage that particularly suitable wavelength ranges can be used for a treatment of the dental object.

In a further technically advantageous embodiment of the exposure apparatus, the exposure apparatus comprises an intensity adjustment means for adjusting a radiation intensity of the radiation source. This provides, for example, the technical advantage that the intensity of the radiation source can be set and changed to a desired value.

In a further technically advantageous embodiment of the exposure apparatus, the exposure apparatus comprises a timer means for activating the radiation source for a predetermined period of time. This provides, for example, the technical advantage that the exposure can be performed automatically for a predetermined period of time.

In a further technically advantageous embodiment of the exposure device, the exposure device comprises a single radiation source for emitting radiation with a wavelength that is smaller than 350 nm. This achieves, for example, the technical advantage of reducing the technical effort required for manufacturing the exposure device.

In a further technically advantageous embodiment of the exposure device, the exposure device comprises a moving means for moving the dental object in front of the radiation source. This achieves, for example, the technical advantage that the radiation can be directed to different areas of the dental object.

In a further technically advantageous embodiment of the exposure device, the direction of movement is configured to move the dental object at a height and/or to rotate it relative to the radiation source. This achieves, for example, the technical advantage that the dental object can be exposed from different sides in a simple manner.

In a further technically advantageous embodiment of the exposure device, the exposure device is configured to move the radiation source to different heights. This achieves, for example, the technical advantage that the dental object can be exposed in a simple manner from various positions.

In a further technically advantageous embodiment of the exposure apparatus, the exposure apparatus comprises an infrared radiation source for emitting radiation having a wavelength into the chamber that is greater than 700 nm. The infrared radiation source may be disposed inside or outside the chamber. Radiation guidance into the chamber may be provided by means of an optical fiber. The infrared radiation source, such as an IR laser, may also be arranged outside the chamber. The emitted radiation can then be scanned by means of a scanner (e.g. DMD—Digital Mirror Device) through a suitable viewing window over the dental object arranged inside the chamber. This achieves, for example, the technical advantage that the dental object can be heated and a coloring of the dental object can be completed.

In a further technically advantageous embodiment of the exposure device, the infrared radiation source is configured to emit radiation with a wavelength between 700 nm and 10 μm, preferably between 700 nm and 5 μm, or most preferably between 700 nm and 3 μm. This provides, for example, the technical advantage that particularly suitable wavelengths are used to heat the dental object.

According to a second aspect, the technical problem is solved by a method for illuminating a dental object, comprising the steps of receiving the dental object in a chamber; and emitting radiation with a wavelength smaller than 350 nm into the chamber. The method achieves the same technical advantages as the exposure apparatus according to the first aspect.

In a technically advantageous embodiment of the method, the dental object is moved while radiation is emitted. This achieves, for example, the technical advantage that the radiation can be directed to different areas of the dental object.

In a further technically advantageous embodiment of the method, the radiation source is moved while emitting radiation. This also achieves, for example, the technical advantage that the radiation can be directed to different areas of the dental object.

In a further technically advantageous embodiment of the method, radiation with a wavelength greater than 700 nm is emitted into the chamber by means of an infrared radiation source. This also provides, for example, the technical advantage of heating the dental object and completing a coloring of the dental object.

In a further technically advantageous embodiment of the method, the infrared radiation source is moved while emitting radiation. This also achieves, for example, the technical advantage that the thermal radiation can be directed to different areas of the dental object.

BRIEF DESCRIPTION OF THE DRAWINGS

Examples of embodiments of the invention are shown in the drawings and will be described in more detail below.

DETAILED DESCRIPTION

Figure 1:
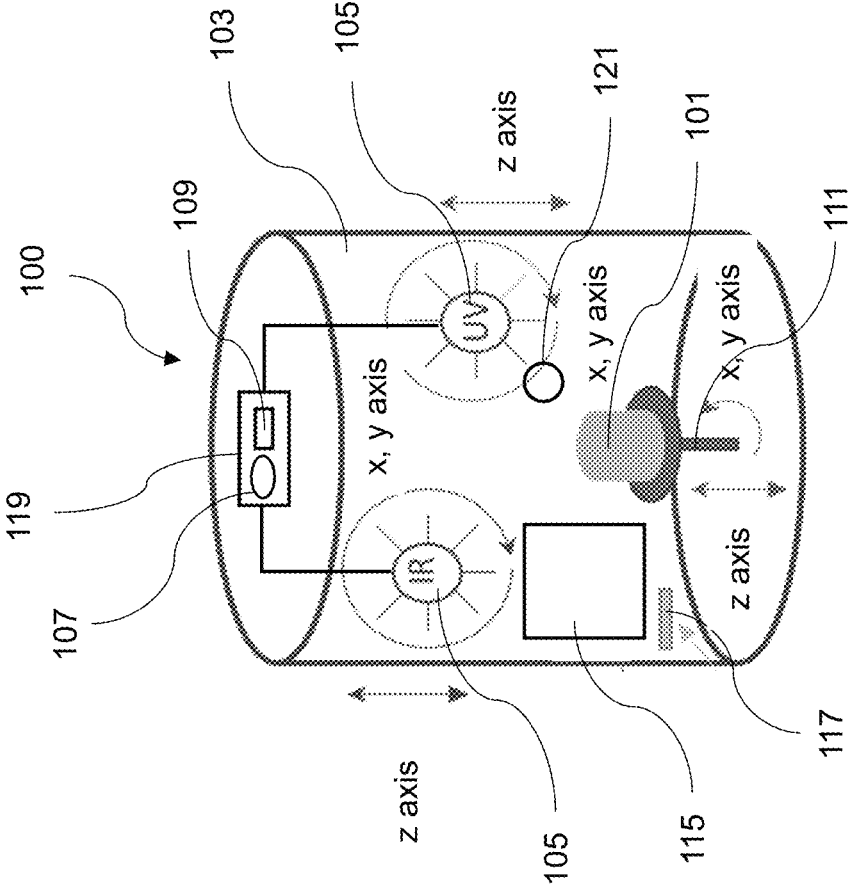
FIG. 1 shows a schematic representation of an exposure device.

FIG. 1 shows a schematic diagram of an exposure device 100. The exposure device 100 is used to expose a dental object 101 made of a polychromic glass and or a polychromic glass ceramic. The dental object 101 is a dental restoration, such as a crown, a bridge, a veneer, an abutment, an inlay, or an onlay.

The exposure device 100 includes a chamber 103 in which the dental object 101 is placed and which surrounds the dental object 101. The exposure device 100 may include a UV transparent holder on which a dental object 101 having a cavity may be placed, allowing illumination of the dental object 101 on the inside. The chamber 103 may include a door 115 that is opened to allow the dental object 101 to be placed inside. To expose the dental object 101 to light, the door 115 is closed to prevent light from exiting the chamber 103 to the outside.

The exposure device 100 includes a radiation source 105 for emitting radiation having a wavelength that is less than 350 nm into the chamber 103. The emitted radiation from the radiation source 105 impinges on the dental object 101. The radiation excites electronic transitions in the dental object 101 that result in a color change when the dental object 101 is subsequently heated.

The exposure apparatus 100 may include an electrical switch that is actuated when the door 115 is opened, and by which the radiation source 105 is deactivated. This provides the technical advantage of preventing hazardous radiation from escaping from the chamber 103. The radiation source 105 is arranged, for example, in a wall of the chamber 103 so that it can radiate into the interior. An aperture plate 121 may be arranged in front of the radiation source 105 to shield the lateral regions of the radiation, such as a pinhole. This allows the emitted radiation to be directed to specific areas of the dental object 101. However, the exposure device 100 may also include an optical fiber used to deliver the radiation from the radiation source 105 to the dental object 101, such as a quartz fiber.

The radiation source 105 is electrically powered and is formed by, for example, a mercury vapor lamp, a quartz lamp, a black light lamp, a UV laser, or a UV light emitting diode. However, the radiation source 105 may also comprise an X-ray tube for generating X-rays. In this case, the radiation source 105 may emit radiation having a wavelength of 5 pm to 10 nm.

The radiation source 105 is suitable for emitting radiation with a wavelength between 350 nm and 5 pm, preferably between 350 nm and 10 nm, or most preferably between 350 nm and 100 nm. However, in addition to using UV radiation, it is also possible to expose the dental object 101 to high energy radiation. For example, with X-rays having a wavelength of 5 pm to 10 nm.

In order to adjust the intensity of the radiation source 105, the exposure apparatus 100 comprises an intensity adjustment means 107. The intensity adjustment means 107 may be formed by a controller that can be used to adjust the power of the radiation source 105. This intensity adjustment means 107 may, for example, be used to adjust the current or voltage at which the radiation source 105 is operated.

However, the intensity adjustment means 107 may also be implemented digitally. In this case, the exposure device 100 comprises a data interface 117 through which data for controlling the intensity of the radiation source 105 can be transmitted from an external device, such as a WLAN interface or a Bluetooth interface.

For example, a mobile phone or tablet can be equipped with a suitable application that can be used to control the intensity of the radiation source 105. To this end, the exposure device 100 includes an electronic control device 119 that communicates with the application and that can increase or decrease the emitted intensity of the radiation source 105. The electronic control device 119 may include a microprocessor and a digital memory that stores data and programs for controlling the functions of the exposure device 100.

In addition, the electronic control device 119 may include a timer means 109 that activates the radiation source 105 for a predetermined period of time and automatically deactivates the radiation source 105 after the predetermined period of time has elapsed. This provides the technical advantage of automatically exposing the dental object 101 for a predetermined exposure period and providing a defined exposure of the dental object 101.

The control device 119 may further comprise a learned algorithm for controlling the radiation source 105 and/or the infrared radiation source 113. The algorithm may be a machine learning algorithm or may comprise an artificial neural network. The algorithm is learned using training data. Examples of machine learning algorithms include but are not limited to, artificial neural network (ANN), XGBoost, decision trees, and the like. US 20220318520, 20220318683, and 11408629 are directed to systems and methods using machine learning algorithms or natural language processing (NLP) and are hereby incorporated by reference in their entirety.

This provides, for example, the technical advantage of using efficient technology to automatically generate a specific exposure and/or temperature program based on experimental data to achieve a desired hue. The experimental data serves as training data to determine the hue. When a desired hue is provided as input to the machine learning algorithm, the algorithm can determine a suitable exposure-temperature program for controlling the radiation source 105 and/or the infrared radiation source 113. In this manner, the exposure temperature program may be automatically generated using the machine learning algorithm. The exposure temperature program may be generated in the background using the machine learning technology and provided to the control device 119.

The control device 119 may also comprise an electronic lookup table in which the respective control data for the radiation source 105 and the infrared radiation source 113 are stored for predetermined shades of the dental object 101. In this way, the dental object 101 with the desired shade can be automatically generated.

The exposure device 100 may include a single or multiple radiation sources 105 for emitting radiation having a wavelength that is less than 350 nm. By using a single radiation source 105, the technical complexity of manufacturing the exposure device 100 is reduced. When using a single radiation source 105, it is advantageous to move the dental object 101 in different spatial directions so that the radiation can strike all areas of the dental object 101.

To this end, the exposure apparatus 100 comprises a moving means 111 for moving the dental object 101 in front of the radiation source 105. The moving means 111 is configured to move the dental object 101 in a height and/or to rotate it with respect to the radiation source 105. The axis of rotation is, for example, a vertical axis (z-axis). Along the axis of rotation, the dental object 101 can additionally be moved linearly. However, the movement means can also be formed by a mechanical arm with which the dental object 101 can be moved inside the chamber 103, such as a robotic arm. This arm can be used to controllably move the dental object 101 in front of the radiation source 105.

The movement means 111 is formed, for example, by a turntable on which the dental object 101 can be arranged. The turntable is rotatable in front of the radiation source 105 and adjustable in height. For this purpose, the turntable is driven, for example, by electric motors via a suitable mechanism. The direction of movement 111 may also be controlled by the electronic control device 119. A movement program may also be stored in the electronic control device 119, which controls the movement means 111 and thereby moves the dental object 101 in a predetermined time sequence with respect to the radiation source 105. By means of the movement program, the dental object 101 can be positioned with respect to the radiation source 105. In doing so, distinct positions can be approached one after the other.

Conversely, however, it is also possible to move the radiation source 105 at a height and/or around the dental object 105 via a further movement means. Also for this purpose, electric motors can be driven via a suitable mechanism. In general, the dental object 101 and/or the radiation source are freely movable.

When multiple radiation sources 105 are used, they may be arranged around the dental object 101. In this way, the dental object 101 can be illuminated from several sides. In this case, a movement means 111 can be dispensed with.

The exposure device 100 may include another additional infrared radiation source 113 for local thermal treatment of the dental object 101 and local color adjustment of the dental object 101. The infrared radiation source 113 emits radiation having a wavelength into the chamber 103 that is greater than 700 nm. The infrared radiation source 113 may be configured to emit radiation having a wavelength between 700 nm and 10 μm, preferably between 700 nm and 5 μm, or most preferably between 700 nm and 3 μm.

The infrared radiation source 113 is formed by, for example, an electrically powered infrared lamp, red light lamp, or heat lamp. However, the infrared radiation source 113 may also be formed by a thermal laser or infrared laser, such as an Nd:YAG laser, an Er:YAG laser, a CO laser, and a $CO_2$ laser. If sufficient energy is absorbed by the glass ceramic, any other wavelength may be used, such as in the visible or UV range. For heating, the only thing that matters is the thermal input into the dental object, preferably without melting or even ablating it. Alternatively, the heat treatment can also be carried out by means of microwave radiation.

To adjust the intensity of the infrared radiation source 105, the exposure apparatus 100 may include another intensity adjustment means 107. Likewise, the electronic control device 119 may include a timer means 109 that activates the infrared radiation source 113 for a predetermined period of time and automatically deactivates the infrared radiation source 113 after the predetermined period of time has elapsed. Also, the infrared radiation source 113 may be movably arranged so that it can be changed in height and moved around the dental object 101. An aperture plate 121 may also be arranged in front of the infrared radiation source 113 to shield the lateral regions of the radiation, such as a pinhole.

Figure 2:
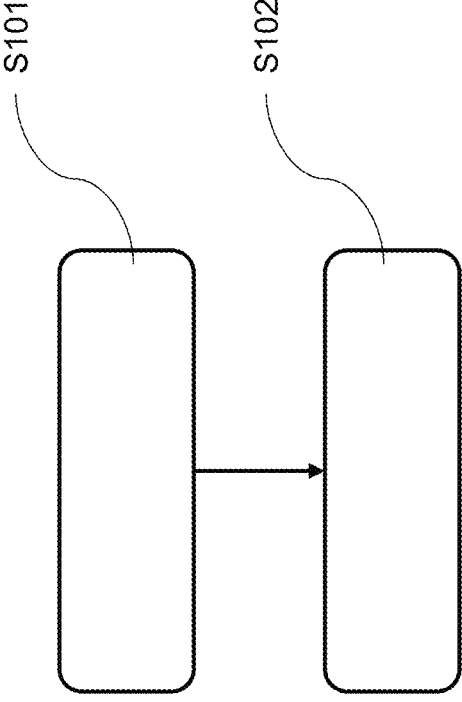
FIG. 2 shows a block diagram of a method for illuminating a dental object.

FIG. 2 shows a block diagram of a method for illuminating a dental object 101. The method comprises the step S101 of receiving the dental object 101 in the chamber 103 of the exposure device 100. In the step S102, radiation having a wavelength smaller than 350 nm is emitted in the chamber 103. This radiation is incident on the dental object 101, and areas of the dental object 101 exposed to the radiation take on a color depending on the previous exposure after the dental object 101 is heated.

This method achieves the technical advantage that the dental object 101 can be safely exposed for coloring, and leakage of radiation can be prevented. A dental object 101 having a cavity may be disposed on a UV-transparent holder that allows illumination of the dental object 101 on the inside.

All of the features explained and shown in connection with individual embodiments of the invention may be provided in various combinations in the subject-matter of the invention to simultaneously realize their beneficial effects.

All method steps can be implemented by means suitable for executing the respective method step. All functions that are executed by the objective means can be a method step of a method.

The scope of protection of the present invention is given by the claims and is not limited by the features explained in the description or shown in the figures.

REFERENCE LIST

100 Exposure unit
101 Dental object
103 Chamber
105 Radiation source
107 Intensity adjustment means or intensity adjuster
109 Timer
111 Movement means
113 Infrared radiation source
115 Door
117 Data interface
119 Electronic control device or electronic controller
121 Aperture plate

The invention claimed is:

1. A method of coloring a dental object (101), comprising the steps of:

receiving (S101) the dental object (101) comprising polychromic glass, polychromic glass-ceramic or a mixture thereof in a chamber (103);

first emitting (S102) radiation from a radiation source (105) having a wavelength smaller than 350 nm into the chamber (103);

thereafter exposing the dental object (101) to infrared radiation from an infrared radiation source (113);

wherein the dental object is rotated in front of the radiation source (105), the infrared radiation source (113), or both by a moving device on which the dental object (101) is arranged; and wherein coloring of the dental object is initiated by the radiation having a wavelength smaller than 350 nm and the coloring of the dental object is completed by the infrared radiation.

2. The method according to claim 1, wherein the dental object (101) is moved while the radiation having a wavelength smaller than 350 nm is being emitted and/or while the infrared radiation is being emitted.

3. The method according to claim 1, wherein the radiation source (105), and/or the infrared radiation source (113) is moved while emitting radiation.

4. The method according to claim 1, wherein the infrared radiation comprises a wavelength equal to or greater than 700 nm.

5. The method according to claim 1, wherein the polychromic glass and polychromic glass-ceramic comprise an oxidizable component and a reducible coloring component.

\* \* \* \* \*